United States Patent Office 3,749,719
Patented July 31, 1973

3,749,719
PROCESS FOR AMINO-s-TRIAZOLO- [4,3-a]PYRAZINES
James Clark, Michael Edward McMenim, Francis Leslie Rose, and Alastair Graham Wylie, Macclesfield, England, assignors to Imperial Chemical Industries Limited, London, England
No Drawing. Filed Aug. 17, 1971, Ser. No. 172,607
Claims priority, application Great Britain, Mar. 4, 1971, 6,029/71
Int. Cl. C07d 57/02
U.S. Cl. 260—250 R    5 Claims

ABSTRACT OF THE DISCLOSURE

An improved process for the manufacture of 3-amino-s-triazolo[4,3-a]pyrazines from 2-hydroxypyrazines by reaction of the latter with a cyanogen halide to produce a new class of compound, 1-cyano-2-pyrazinones, which are then reacted with hydrazine to give the desired products.

---

This invention relates to pyrazine derivatives and their manufacture, and more particularly it relates to novel 1-cyano - 2 - pyrazinone derivatives and their use for the manufacture of 3-amino-s-triazolo[4,3-a]pyrazine derivatives.

In U.K. patent specification No. 1,146,770 there are described and claimed s-triazolo[4,3-a]pyrazine derivatives of the formula:

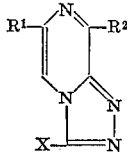

(I)

wherein $R^1$ and $R^2$ are alkyl radicals and X is an amino, hydroxy, formamido or acetamido radical, which are stated to possess the property of preventing bronchospasm and therefore to be useful in the treatment of diseases involving spasm or constriction of the bronchial musculature, for example asthma or bronchitis. In the same specification, there is also described and claimed a process for the manufacture of the compounds, wherein X is an acetamido or formamido radical, by the acylation of the corresponding compounds wherein X is an amino radical. These latter compounds are thus not only therapeutically active substances themselves, but also valuable intermediates for the manufacture of other therapeutically active substances.

The above-mentioned specification describes a method for the manufacture of a s-triazolo[4,3-a]pyrazine derivative of Formula I, wherein X is an amino radical, from a 2 - hydroxy-3,5-dialkylpyrazine which consists of the steps of:

(a) Converting the 2-hydroxy-3,5-dialkylpyrazine into the corresponding 2-chloro-3,5-dialkylpyrazine by reaction with phosphorus oxychloride, (b) Reacting the 2-chloro derivative so formed with hydrazine to give a 2-hydrazino-3,5-dialkylpyrazine, and (c) Cyclising the 2-hydrazino derivative with a cyanogen halide to give a 3-amino-6,8-dialkyl-s-triazolo[4,3-a]-pyrazine of Formula I, wherein X is an amino radical. While this sequence of reactions is perfectly satisfactory when carried out on a laboratory scale, it involves a number of disadvantages when carried out on a manufacturing scale, for example the chlorination reaction has to be carried out for a long time at a high temperature, the reaction with hydrazine has also to be carried out at a high temperature with consequent hazards, and the yields at each stage are only moderate. It is an object of this invention to provide a method of manufacturing s-triazolo [4,3-a]pyrazine derivatives of Formula I, wherein X is an amino radical in which some of the disadvantages of the above sequence can be alleviated, and which can give the desired products in a greater overall yield than by the above sequence.

It has now been discovered that such a superior process for the manufacture of the desired products can be evolved by the use of a new class of intermediate, 1-cyano-2-pyrazinones, which will react with hydrazine at a low temperature to give the desired products. Since these 1-cyano-2-pyrazinones may be obtained by a single new chemical reaction from 2-hydroxy-3,5-dialkylpyrazines, the overall sequence involves only two steps from the starting 2-hydroxy-3,5-dialkylpyrazines with a consequent improvement in the overall yield.

According to the invention there is provided a 1-cyano-2-pyrazinone derivative of the formula:

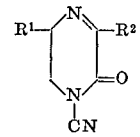

wherein $R^1$ and $R^2$, which may be the same or different, are alkyl radicals of 1–4 carbon atoms.

Preferred 1-cyano-2-pyrazinone derivatives of the invention comprise those compounds in which $R^1$ and $R^2$ are alkyl radicals which together contain not more than 5 carbon atoms, particularly those compounds in which $R^1$ or $R^2$ is a methyl or n-propyl radical, especially the compound in which $R^1$ is a methyl radical and $R^2$ is an n-propyl radical.

According to a further feature of the invention there is provided a process for the manufacture of a 1-cyano-2-pyrazinone derivative of the invention which comprises reacting a hydroxypyrazine derivative of the formula:

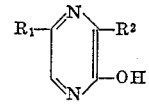

wherein $R^1$ and $^2$ have the meanings stated above, with a cyanogen halide in the presence of a base which will convert the hydroxypyrazine into its anion.

The reaction may be carried out in a diluent or solvent, for example a water-miscible polar solvent such as dimethylformamide, dioxan or tetrahydrofuran, or a mixture of any of the above solvents with water, or water itself or toluene. The preferred reaction medium is a mixture of dimethylformamide and water.

Particularly suitable cyanogen halides are cyanogen chloride or cyanogen bromide, of which cyanogen chloride is preferred, and the cyanogen halide may be used in greater than an equimolar amount. A suitable base for use in the reaction is, for example, an alkali metal hydroxide, for example sodium hydroxide or potassium hydroxide, an organic tertiary alkylamine in which the alkyl radicals are of 1–4 carbon atoms, for example triethylamine, or, particularly when the reaction is carried out under anhydrous conditions, an alkali metal hydride, for example sodium hydride or potassium hydride, or an alkali metal alkoxide, for example potassium t-butoxide.

The reaction may be carried out at a temperature from −10° C. to 25° C., but preferably at a temperature from 0° C. to 10° C.

Thus preferred conditions for the above process are reaction of the hydroxypyrazine derivative with cyanogen chloride in aqueous dimethylformamide in the presence of sodium hydroxide and at a temperature from 0° C. to 10° C.

According to a further feature of the invention there is provided a method for the use of a 1-cyano-2-pyrazinone derivative of the invention for the manufacture of a 3-amino-s-triazolo[4,3-a]pyrazine derivative in the form of a process for the manufacture of an amino-s-triazolo [4,3-a]pyrazine derivative of the formula:

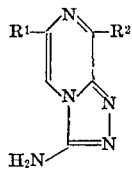

wherein $R^1$ and $R^2$ have the meanings stated above, which comprises reacting a 1-cyano-2-pyrazinone derivative of the formula:

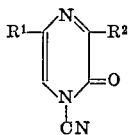

wherein $R^1$ and $R^2$ have the meanings stated above, with hydrazine.

The process may be carried out in a wide variety of polar and non-polar organic solvents and in water. However in solvents other than water or lower alkanols, for example ethanol or methanol, the product obtained is contaminated with the hydroxypyrazine derivative obtained from the starting material by loss of the 1-cyano radical. The preferred solvent for use in the process is water, and thus the hydrazine can conveniently be used in the form of hydrazine hydrate. The pH of such a mixture is 9–10, and this pH range is preferred. In order to reduce the solubility of the product in the reaction medium, a salt such as sodium chloride may be included in the reaction medium.

The reaction can be carried out at a temperature from —10° C. to 25° C., but at the higher temperatures, the amount of hydroxypyrazine impurity in the product is increased, while at the lower temperatures, the reaction is rather slow. It is preferred that the reaction be started at 0° C. and the temperature allowed to rise slowly to ambient temperature.

The invention is illustrated but not limited by the following examples.

EXAMPLE 1

Cyanogen chloride (8.2 g.) is dissolved in a stirred mixture of dimethylformamide (4.8 ml.) and water (30 ml.) at 0–5° C., and a solution of 2-hydroxy-5-methyl-3-n-propyl-pyrazine hydrate (17.0 g.) and sodium hydroxide (4.4 g.) in water (30 ml.) is added at 0–5° C. during 5 minutes. The reaction mixture is stirred for 10 minutes and then filtered. The solid product is washed with water and dried to give 1 - cyano - 5 - methyl-3-n-propyl-2-pyrazinone, M.P. 69–70° C. (15.9 g. 90%).

EXAMPLE 2

Anhydrous 2 - hydroxy - 5 - methyl-3-n-propylpyrazine (22.2 g.) is dissolved in dimethylformamide (100 ml.) and the solution is stirred at 0° C. while a 50% dispersion of sodium hydride in oil (7.7 g.) is added in portions. The mixture is stirred for 30 minutes at 0–5° C. and then a solution of cyanogen bromide (17.0 g.) in dimethylformamide (20 ml.) is added over a further 30 minutes. The mixture is stirred for a further 1 hour and then poured into a mixture of ice and water (1 kg.). The solid so formed is filtered off, washed with water and then petrol, and then dried to give 1-cyano-5-methyl-3-n-propyl-2-pyrazine, M.P. 69–70° C. (8.2 g., 32%).

EXAMPLE 3

1-cyano-5-methyl-3-n-propyl-2-pyrazinone (700 g.) is added in portions to a stirred solution of sodium chloride (746 g.) and 100% hydrazine hydrate (466 ml.) in water (2,400 ml.) at 0° C. during 30 minutes. The reaction vessel is sealed and the mixture stirred for 2 days while the temperature slowly rises to ambient. The reaction mixture is then filtered and the solid washed with water (300 ml.) and dried to give 3-amino-6-methyl-8-n-propyl-s-triazolo[4,3-a]pyrazine, M.P. 199–200° C. (490 g., 65%).

This product is suitable for direct conversion into an acylated derivative, for example the 3-acetamido derivative may be obtained by acylation with acetic anhydride.

EXAMPLE 4

2-Hydroxy - 3,5 - dimethylpyrazine (7.5 g.) is dissolved in dimethylformamide (70 ml.) and the solution is stirred with a 60% dispersion of sodium hydride in oil (2.7 g.) at 10–15° C. until the evolution of hydrogen is finished. Cyanogen chloride gas is passed into the solution at this temperature until 5 g. has been absorbed. The mixture is stirred for 2 hours and then evaporated to dryness in vacuo. Crystallisation of the solid residue from cyclohexane gives 1 - cyano - 3,5 - dimethyl - 2 - pyrazinone, M.P. 96–96.5° C.

EXAMPLE 5

2-hydroxy - 3,5 - di-n-propylpyrazine hydrate (2.97 g. is dissolved in a solution of sodium hydroxide (0.6 g.) in water (20 ml.). The solution is stirred at 0° C. and a solution of cyanogen chloride (0.925 g.) in dimethylformamide (5 ml.) is added, allowing the temperature to rise to 20° C. the insoluble precipitate is filtered off, washed with water, and dried, to give pure 1-cyano-3,5-di-n-propyl - 2 - pyrazinone, M.P. 42–43° C.

EXAMPLE 6

A solution of 1-cyano - 3,5 - di-n-propyl-2-pyrazinone (2.25 g.) in ether (20 ml.), is stirred with a solution of hydrazine hydrate (1.1 g.) in water (10 ml.) at 0–10° C. for 6 hours. A solid is precipitated, which is filtered off, washed with water, and recrystallised from ethanol to give 3-amino - 6,8 - di-n-proupyl-s-triazolo[4,3-a]pyrazine, M.P. 192–194° C.

What is claimed is:

1. A process for the manufacture of an amino-s-triazolo-[4,3-a]pyrazine of the formula:

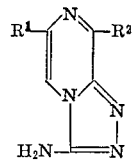

wherein $R^1$ and $R^2$ are alkyl of 1–4 carbon atoms, comprising reacting a 1-cyano - 2 - pyrazinone of the formula:

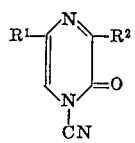

with hydrazine in water at a pH of 9–10 and at a temperature of from —10° C. to 25° C.

2. A process as claimed in claim 1 wherein the hydrazine is used in the form of hydrazine hydrate and the reaction is carried out at a temperature initially at 0° C. and allowed to rise slowly to ambient temperature.

3. A process for the manufacture of an amino-s-triazolo-[4,3-a]pyrazine of the formula:

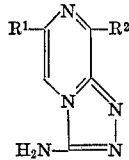

wherein $R^1$ and $R^2$ are alkyl of 1–4 carbon atoms, comprising the steps of:
(a) reacting a hydroxypyrazine of the formula:

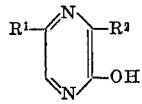

with cyanogen chloride or cyanogen bromide in the presence of a base which will convert the hydroxypyrazine into its anion and in a solvent at a temperature of from −10° C. to 25° C. to give a 1-cyano-2-pyrazinone of the formula:

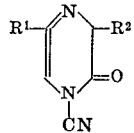

and
(b) reacting the 1-cyano-2-pyrazinone with hydrazine at a pH of 9–10 and a temperature of from −10° C. to 25° C.

4. A process as claimed in claim 3 wherein $R^1$ is methyl and $R^2$ is n-propyl.

5. A process as claimed in claim 2 wherein $R^1$ is methyl and $R^2$ is n-propyl.

References Cited

UNITED STATES PATENTS 3,594,479   7/1971   Maguire et al. _____ 424—250
3,629,260   12/1971  Maguire et al. _____ 260—250

OTHER REFERENCES

Nelson: Chem. Abstracts 58: 5674h–5675f (1963).
Mallett and Rose: Chem. Abstracts 66: 2536r (1967).
Potts: Chem. Abstracts 69: 77232j (1968).
Maguire: Chem Abstracts 71: 49891w (1969).

ALEX MAZEL, Primary Examer
R. D. McCLOUD, Assistant Examiner

U.S. Cl. X.R.
424—250